United States Patent [19]

Rafanelli et al.

[11] Patent Number: 5,243,351
[45] Date of Patent: Sep. 7, 1993

[54] FULL APERTURE IMAGE SYNTHESIS USING ROTATING STRIP APERTURE IMAGE MEASUREMENTS

[75] Inventors: Gerard L. Rafanelli, Fountain Valley; Mark J. Rehfield, Rancho Palos Verdes, both of Calif.

[73] Assignee: Hughes Aircraft Company, Los Angeles, Calif.

[21] Appl. No.: 904,235

[22] Filed: Jun. 25, 1992

[51] Int. Cl.$^5$ .................. G01S 13/89; G01S 13/90
[52] U.S. Cl. ............................. 342/351; 342/25; 342/53; 342/191; 342/179
[58] Field of Search .............. 342/351, 25, 21, 52, 342/53, 54, 191, 179, 194, 195, 196, 197, 424, 378

[56] References Cited

U.S. PATENT DOCUMENTS

| | | | |
|---|---|---|---|
| 4,724,439 | 2/1988 | Wiley et al. | 342/351 |
| 5,122,803 | 6/1992 | Stann et al. | 342/25 |
| 5,122,805 | 6/1992 | Peterman et al. | 342/26 |
| 5,132,686 | 7/1992 | Witte | 342/25 |
| 5,160,934 | 11/1992 | Alpers et al. | 342/351 |
| 5,164,730 | 11/1992 | Jain | 342/25 |
| 5,166,688 | 11/1992 | Moreira | 342/25 |

Primary Examiner—John B. Sotomayor
Attorney, Agent, or Firm—Michael W. Sales; Wanda K. Denson-Low

[57] ABSTRACT

A spinning strip aperture imaging radiometer sensor system and data processing method that is capable of synthesizing full circular aperture images from a plurality of image frames acquired by the strip aperture imaging sensor. One embodiment of the imaging system comprises a rotating strip aperture wide field of view telescope, a two dimensional detector array used to detect images in the telescope's focal plane, a rotation compensation device used to prevent rotational smear during the integration time of the detectors, a signal processor used to record a plurality of image frames of a target scene that is imaged by the telescope as it rotates around its optical axis, and a signal processor and method used to synthesize the full circular aperture image from the recorded images. The operation of the full aperture image synthesis method hinges upon the ability of the rotating strip aperture to measure all of the spatial frequencies contained in a full circular aperture image measurement. Having knowledge of the strip apertures' spatial frequency passband, and the temporal registrations of each of the recorded strip aperture images permits synthesis of the full aperture image by the sensor system and image synthesis method. Image synthesis may be accomplished in the spatial or spatial frequency domains. General and illustrative examples of the image synthesis procedure and first order noise performance predictions are described. A general form of the invention utilizes two dimensional spatial frequency information to greatly reduce the line of sight stability requirements of the telescope.

31 Claims, 12 Drawing Sheets

FULL APERTURE IMAGE SYNTHESIS USING ROTATING STRIP APERTURE IMAGE MEASUREMENTS

BACKGROUND

The present invention relates generally to spinning aperture radiometers, and more particularly to spinning strip (partial) aperture imaging radiometers that synthesize circular (full) aperture radiometric images from a plurality of rotating strip aperture image measurements.

To provide high resolution images from space-based platforms, for example, conventional sensor architectures incorporate active control of large, heavy, deployable optical systems. Depending upon the mission requirements and the size of the primary mirror, the active control can range from periodic piston and tilt control of primary mirror segments to piston, tilt, figure, and alignment control of all optical elements comprising the sensor.

Full aperture systems with the same resolution as the present invention have a great deal of light gathering capability because of their relatively large aperture areas. However, to place multi-meter diameter apertures into orbit, full aperture systems competing with the present invention require: segmented optical surfaces and folded support structures, if the optical system diameters are larger than the launch vehicle's fairing; complex and potentially high bandwidth adaptive optical techniques, if thin deformable mirrors are used to save weight; and complex piston and pupil matching control, if implemented as a phased array. Therefore, the full aperture systems are relatively heavy and have high technical risk when compared to the present invention.

The closest prior art relating to the present invention is disclosed in U.S. Pat. No. 4,724,439 entitled "Microwave Radiometer Using Fanbeam Inversion" issued to Wiley et al., and assigned to the assignee of the present invention. The invention taught in that patent is generally known as the "SPINRAD" system. The commonality of the approaches between the SPINRAD system and the system of the present invention (referred to as SPINAP) arises from the use of temporally registered strip aperture measurements to synthesize the equivalent full aperture image.

However, the SPINRAD system makes use of only one dimensional spatial frequency information from each of its' equivalent strip aperture measurements, and as such requires fine resolution line of sight control. Furthermore, the SPINRAD system provides for imaging in the microwave frequency region only.

Therefore, it would be an advantage to have a system and image processing method that provides a low risk, low cost, light weight, and simple fabrication and deployment alternative to deploying complex, large aperture, adaptive optical systems for space-based imaging applications.

SUMMARY OF THE INVENTION

In order to provide for the above and other advantages, one embodiment of the present invention provides for a spinning strip radiometer system. The system includes a rotating strip aperture telescope that produces temporally continuous images. The rotating strip aperture telescope typically comprises a rotating strip aperture primary reflector and a secondary reflector. A two-dimensional detector array is provided to detect images located in the focal plane of the telescope. Rotation compensation means is employed to prevent rotational smear during the integration time of the detectors of the array. A signal processor is provided for recording a plurality of image frames of a target scene imaged by the telescope as the strip aperture rotates around the telescope's optical axis, and for synthesizing a full circular aperture image from the recorded image frames.

The present invention thus provides for a spinning strip (partial) aperture imaging radiometer that synthesizes circular (full) aperture radiometric images from a plurality of rotating strip aperture image measurements, while compensating for random line of sight errors between individual strip aperture images. The present invention thus provides improved high resolution images when compared to a conventional optical system of the same weight.

One embodiment of a synthesizing process performed by the sensor and processor of the invention summarized above is as follows. As the spinning strip aperture rotates around the telescope's optical axis the following occurs. The rotation compensation means counter-rotates during the integration time of the detectors, thereby providing a stationary image. An image frame is recorded and saved. If a rotating (relative to the scene) detector array architecture has been selected, the acquired frame is coordinate transformed and interpolated to a reference grid of the synthesized image. The data in the image frame is spatially Fourier transformed and stored. A new frame is recorded and saved. An estimate of the frame-to-frame misregistration of the recorded data due to random line of sight errors is obtained. The strip aperture images, or their Fourier transforms, are corrected for their line of sight errors and are stored. The preceding steps are sequentially repeated for each strip aperture image frame.

After all image frames have been processed and saved, the full aperture image spectrum is synthesized by summing redundant individual spatial frequency components from the strip aperture measurements that correspond to the reference grid of the full aperture spatial frequencies, then dividing the summed result by the number of frames contributing to the spatial frequency redundancy, and spatial frequency filtering the resultant data using an appropriate spatial frequency synthesizer. The final full aperture image is obtained by performing an inverse Fourier transform on the synthesized image spectrum.

Nominally, the longest dimension of the rotating strip aperture is identical to the diameter of the full aperture optical system to be synthesized. The shortest dimension is selected to optimize overall system performance in the context of scenario parameters, such as: cost to orbit budget, signal to noise ratio requirements, and downlink data rates. Depending upon the selected optical system and operational parameters, the image synthesis may be accomplished in either the spatial domain, or the spatial frequency domain.

Since each embodiment of the radiometer system and image synthesis processing method depends upon specific mission requirements and engineering tradeoffs, the radiometer system and image synthesis method incorporates means to compensate for random line of sight drift between frames, and apriori and aposteriori known error sources, such as non-isoplanatic optical system point spread functions, field point independent image smear due to image motion and the finite electronic bandwidth of the detectors, and field point dependent image smear caused by uncompensated rotational motion of the image. The performance of the compensation techniques employed in the present system and method depend upon the accuracy of the apriori and aposteriori knowledge, and the effective signal to noise ratio.

The present system and method provide for a new class of space-based optical imaging sensors and processing architectures that is capable of providing full aperture high resolution imagery from an optical system comprising a rotating strip aperture. The image measurement and synthesis procedures of the present invention have the advantages of providing a low risk, low cost, light weight, simple fabrication and deployment alternative to deploying complex, large aperture adaptive optical systems for space-based high resolution imaging applications.

The present system and method are adapted to provide for high resolution imagery from a satellite orbit, particularly when the weight of the telescope is a sizeable fraction of the weight of the payload. The cost of launching a satellite is to large measure a function of its weight in orbit. It is estimated that for a given allowable telescope weight, the present system provides more than four times higher resolution than conventional means. Moreover, the strip-like aperture of the present system permits packing of an aperture that is longer than the fairing diameter of the launch vehicle, with a minimum number of folds in the primary optical surface. For some launch vehicles and strip aperture aspect ratios, no folds are necessary.

The present invention may be used in such systems as earth looking high resolution (equivalent to large aperture) astronomical space based observatories, commercial earth observation, space based geophysical observatories, and earth imaging for scientific and other applications. Any application that requires high resolution in conjunction with extended access and dwell time provided by high earth orbit, or other orbit geometry, can benefit from the technology of the present invention.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIGS. 13a and 13b show a synthesized image without frame to frame jitter removal and with jitter removal, respectively, produced using the present invention, while

DETAILED DESCRIPTION

Figure 1:
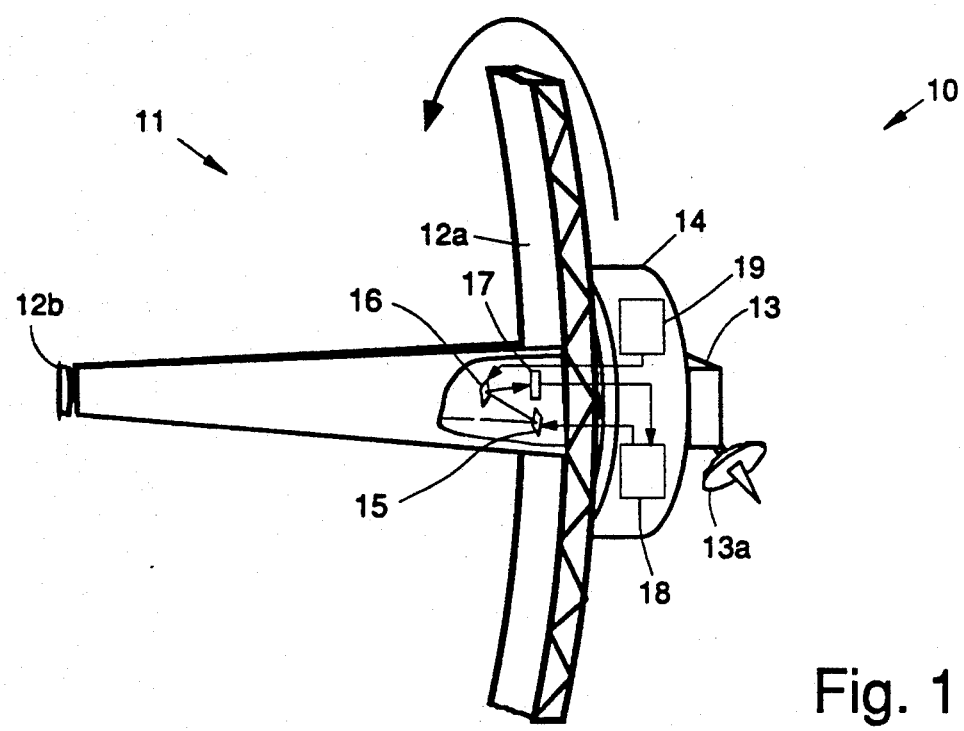
FIG. 1 is an illustration of a spinning aperture radiometer system in accordance with the principles of the present invention.

Referring to the drawing figures, FIG. 1 is an example of a spinning aperture imaging radiometer system 10 in accordance with the principles of the present invention. The spinning aperture imaging radiometer system 10 is adapted to synthesize full aperture radiometric images, while removing line of sight jitter, and provide improved high resolution images when compared to conventional optical systems of the same weight. The spinning aperture imaging radiometer system 10 comprises a rotating strip aperture telescope 11 that comprises a primary mirror 12a and a secondary reflector 12b. A tertiary reflector (not shown) may be employed in the telescope 11 under certain circumstances.

For the purposes of the present disclosure, the system 10 is shown in the form of a satellite comprising a stationary earth pointing section 13 having an earth pointing antenna 13a. The telescope 11 is disposed on a platform 14, to which the stationary earth-pointing section 13 is also attached. The spinning aperture imaging radiometer system 10 is adapted to record a number of image frames of a target scene imaged by the telescope 11 as the primary mirror 12a (comprising a strip aperture 12) rotates around the telescope's optical axis. A line of sight stabilization mirror 15 and an image derotation device 16 are disposed along the optical path of the telescope 11 that are adapted to stabilize and derotate the image prior to its sensing by a detector array 17. The derotation device 16 counter rotates the image during the integration time of detectors comprising the detector array 17, under control of a rotation compensation controller 19, thereby providing a stationary image. The line of sight stabilization mirror 15 is used by a line of sight control system (such as may be provided by a signal processor 18 or other dedicated control system) to remove high bandwidth line of sight errors, as well as line of sight errors due to orbital dynamics of the system 10. The target scene is imaged onto the detector array 17 located at the focal plane of the telescope 11 that is coupled to the signal processor 18 that is adapted to process the image frames. Individual image frames are processed and combined in the signal processor 18 to synthesize a full circular aperture image in accordance with processing methods 20 of the present invention.

Figure 1A:
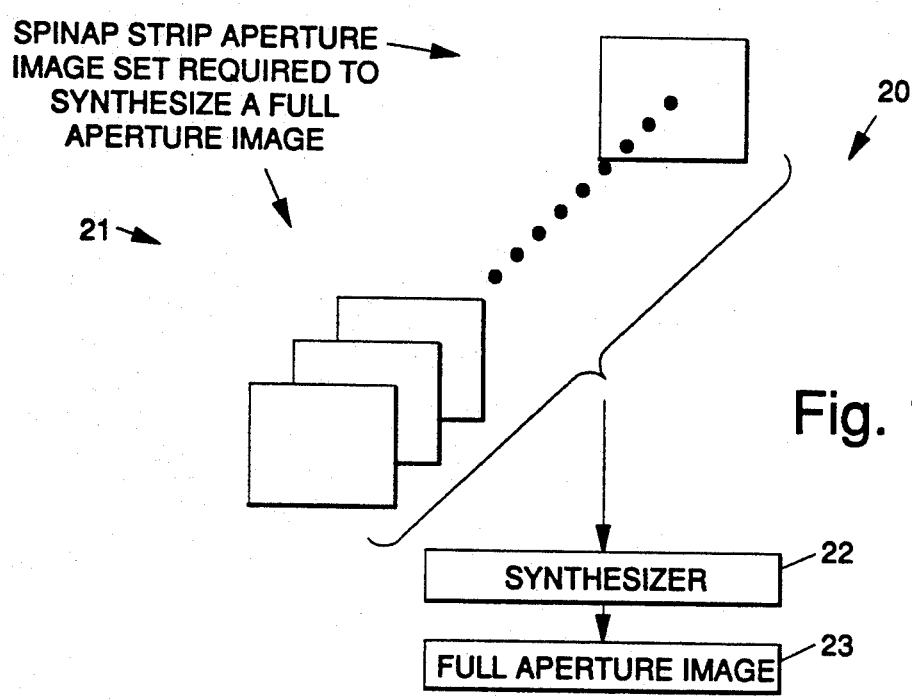
FIGS. 1a and 1b illustrate two embodiments of basic image synthesis processing methods in accordance with the principles of the present invention employed in the spinning aperture radiometer system of FIG. 1.
Figure 1B:
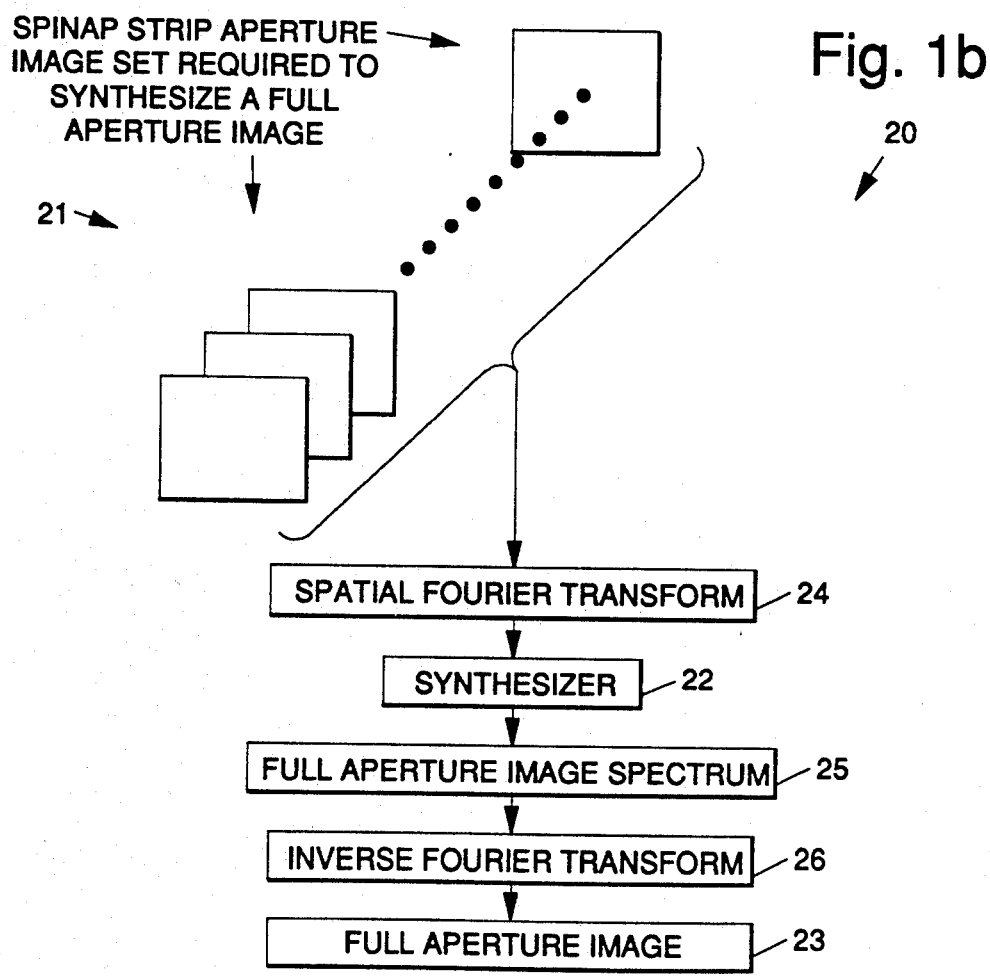

FIGS. 1a and 1b illustrate two embodiments of basic image synthesis processing methods 20 in accordance with the principles of the present invention employed in the spinning aperture radiometer system of FIG. 1. In the method 20 of FIG. 1a, a strip aperture image set is generated 21 and employed in a synthesizer 22 which generates a full aperture image 23. Alternatively, and with reference to FIG. 1b, in the method shown therein, a strip aperture image set is generated 21 and the individual images in the set are spatially Fourier transformed 24. Then the spatially Fourier transformed images are employed in a synthesizer 22 to generate a full aperture image spectrum 25. The full aperture image spectrum 25 is then inverse Fourier transformed 26 to produce the full aperture image 23.

Figure 2:
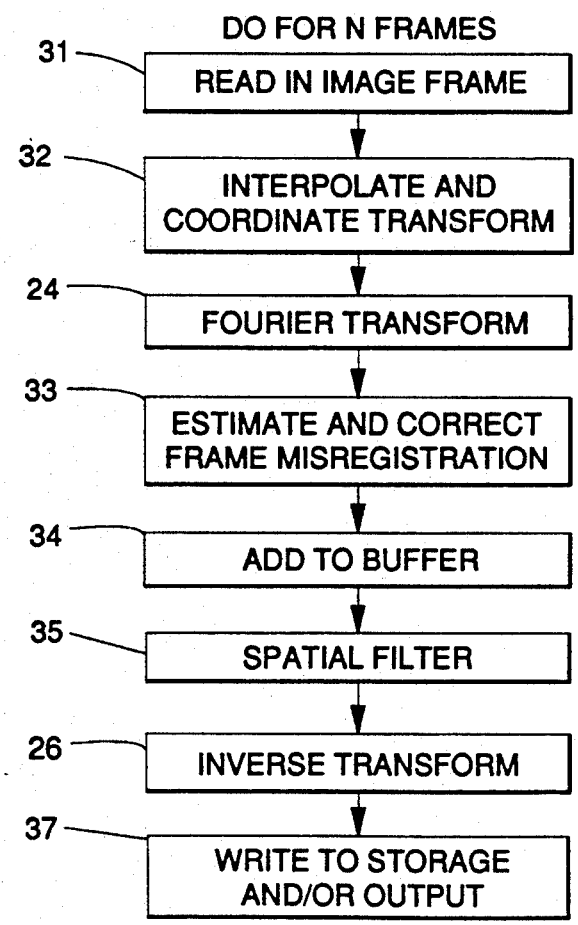
FIG. 2 is a flowchart illustrating a more detailed image synthesis method in accordance with the principles of the present invention employed in the spinning aperture radiometer system of FIG. 1.

A more detailed image synthesis processing method employed in the spinning aperture radiometer system 10 of FIG. 1 is illustrated in FIG. 2. FIG. 2 illustrates a particular embodiment of the image synthesis processing method 20 in accordance with the principles of the present invention that is employed in the spinning aperture imaging radiometer system 10 of FIG. 1. The steps identified in FIG. 2 illustrate a particular embodiment of the image synthesis processing method 20 for which the detector array 17 is stationary relative to the pupil of the rotating strip aperture telescope 11. The image stabilization mirror 15 and image derotation device 16 (FIG. 1) are employed to provide a stationary image during detector integration time. The image synthesis processing method 20 is performed using each recorded frame obtained while the spinning strip aperture telescope 11 rotates about its optical axis. The number of frames to be processed depend upon the aspect ratio of the strip aperture telescope 11, the signal to noise ratio requirements, the percentage overlap in the spatial frequency passband of consecutive frames, image quality and final resolution requirements.

For each frame, the illustrative embodiment of the image synthesis processing method 20 first reads in the image frame, illustrated in step 31. Next, the acquired frame is coordinate transformed and interpolated to a reference grid for the synthesized image, as illustrated in step 32. Next, each frame is Fourier transformed, as illustrated in step 24. Next, an estimate of the frame to frame misregistration (jitter) is computed and corrected, as illustrated in step 33. The jitter corrected Fourier transform of the image frame data is then added to a memory buffer, as illustrated in step 34. The preceding steps are repeated for all of the acquired frames. Once all Fourier transformed and jitter corrected frames have been added to the buffer, step 34, the totality of the spatial frequency components in the buffer corresponds to the totality of spatial frequency information in the full aperture image.

The image data representative of the full aperture image is then spatial frequency filtered, step 35, using an appropriate spatial frequency synthesizer, and inverse Fourier transformed, as illustrated in step 26. The filtered and inverse Fourier transformed image data, now representative of the full aperture image, is written to a storage device, or output to an earth station, for example, by way of the earth-pointing antenna 13a, illustrated in step 36. Alternatively, the unprocessed strip aperture images may be sent to an earth station and synthesized into a full aperture image by the processing method 20 using processors on the ground. At this point the image may be stored, further processed, disseminated, and used as an image acquired by conventional means.

With reference to FIG. 1 and with regard to the rotating strip aperture 12, the longest dimension of the telescope 11 is nominally identical to the diameter of a full aperture optical system to be synthesized. The shortest dimension of the telescope 11 is selected to optimize overall system performance in the context of parameters such as: cost for the spacecraft, payload, and launch, signal to noise ratio requirements, and signal train data rates. Depending upon the selected optical system and operational parameters, the image synthesis may be accomplished in either the spatial domain, or the spatial frequency domain (as explained in the previous illustrative example). The dimensions of the rotating strip aperture telescope 11, the rotation rates, the detector integration time, and the number of strip aperture frames recorded during a rotation are selected so that the totality of measurements incorporate all of the spatial frequencies contained in the desired full aperture image.

Having knowledge of the spatial frequency passband of the strip aperture, the temporal registrations of each of the recorded strip aperture images, and other apriori and aposteriori optical system information such as the field point dependence of the optical system point spread function, finite detection bandwidth, uncompensated rotational motion, residual optical wavefront errors, and scene spectrum permits synthesis of the full aperture image by the general image synthesis processing method 20, by adapting the basic steps 21 through 27 to compensate for such errors and prior knowledge. A summary of a potential class of noise optimal embodiments of the general synthesis procedure is described below. The performance of the compensation technique depends upon the accuracy of the apriori and aposteriori knowledge, and the effective signal to noise ratio.

The present system 10 and processing method 20 are designed to achieve high resolution imagery from a satellite orbit, using telescope 11 that is a significant fraction of the weight of the satellite. The cost of launching a satellite is to a large measure a function of the "weight to orbit". It is estimated that for a given allowable "weight to orbit" the system 10 provides more than four times the resolution available by conventional means. Moreover, the strip-like aperture of the present system permits packing an aperture that is much longer than the a launch vehicle's fairing diameter, with a minimum number of folds in the primary optical surface. For some launch vehicles and strip aperture aspect ratios, no folds are necessary.

Figure 3:
FIG. 3 is illustrative of a single image generated by the spinning aperture radiometer system of FIG. 1.
Figure 4:
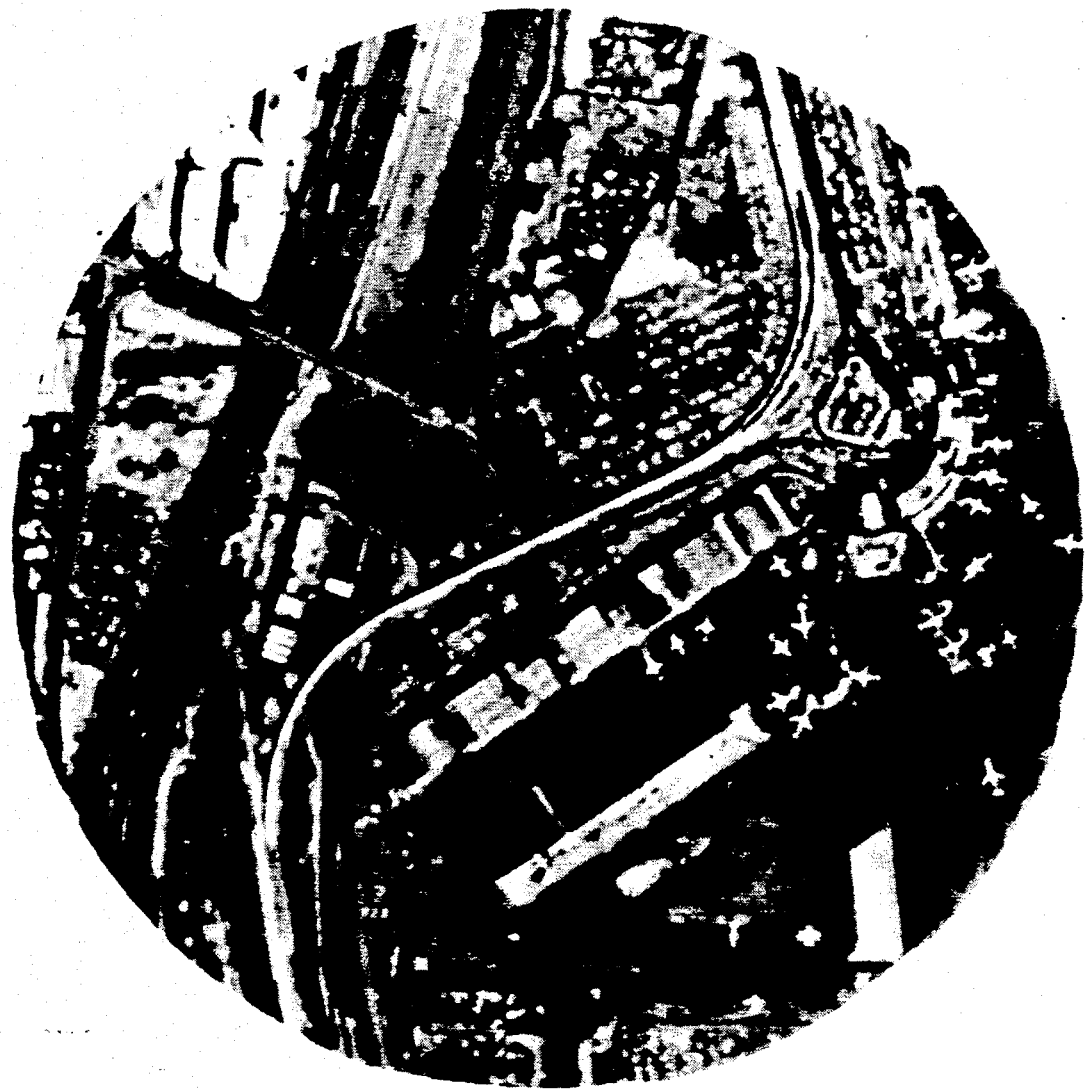
FIG. 4 is illustrative of a synthesized full aperture image produced by applying the image synthesis process of FIG. 2 to sixty single images, having resolution comparable to the image in FIG. 3, and obtained from the spinning aperture radiometer system of FIG. 1.

By way of example, FIG. 3 shows a simulated image generated by the spinning aperture imaging radiometer system 10 of FIG. 1, while FIG. 4 shows a simulated synthesized image produced by system 10 derived from sixty (60) single images having image quality comparable to that depicted in FIG. 3. From FIG. 4, it should be clear that the present system 10 and processing method 20 generate synthesized images having resolution comparable to the full circular aperture system using only a relatively thin rotating strip aperture 12.

Conventional circular aperture systems with the same resolution have greater light gathering capability than the strip aperture system 10 because of their larger aperture areas. However, there are important applications where ample time to integrate is available, and may be used to compensate for the smaller collecting area of the present system 10. Typical applications are: imaging of stars and planets from low earth orbit, earth science and surveillance.

The present invention may be adapted for use in such systems as: high resolution (equivalent to large aperture) astronomical space based observatories, commercial earth observation, space based geophysical observatories, and earth imaging for scientific and other applications. Any application that requires high resolution in conjunction with extended access and dwell time provided by high earth orbit, or other orbit geometry, can benefit from the technology of the present invention. For imaging scenarios in which scene elements are changing from frame to frame additional post processing will enable the exploitation of the observed effects for change detection, as well as for determination of the scene's moving element's motion parameters, and reconstructing the scene's moving element with motion smear effects removed.

In addition to the strip aperture geometry of the present invention, image synthesis procedures using rotating apertures of a variety of shapes and forms, recognizable to one skilled in the art, can be used in conjunction with the general image synthesis processing method 20 to produce an equivalent full aperture image. In particular, multiple-strip aperture geometry in which several radial strips may be used as the image acquisition sensor, or a phased array geometry in which two or more telescopes are coherently joined, by methods known in the art, to produce the images used in the synthesis operation. For a sparse phased array, rotation in conjunction with prescribed variations of the separation distances between telescopes must be used to fill the gaps in the spatial frequency passband of the measurements.

The system 10 thus provides a low risk, low cost, light weight, simple fabrication and deployment alternative to deploying complex, large aperture, adaptive optical systems for space-based high resolution imaging applications. The system 10 does not require (but may use) active control of mirror surfaces. The control technology used with system 10 is consistent with currently demonstrated, and deployed technology.

In order to more fully understand the improvements provided by the present invention, a comparison of the present SPINAP system 10 and the SPINRAD system is given below. The SPINRAD system and the SPINAP system 10 differ primarily in that the SPINAP system 10, in its most general form, utilizes two dimensional spatial frequency content of each frame, whereas the SPINRAD system makes use of only one dimensional spatial frequency information. The additional information in the SPINAP image frames provides a means to estimate frame to frame line of sight (LOS) errors using cross-coherence (or cross-correlation) techniques, and uses the line of sight error estimates to correctly register the individual strip aperture images. Consequently, the use of two dimensional spatial frequency information greatly reduces the line of sight stability required to perform the full aperture image synthesis, and reduces the number of frames required to measure the full aperture spatial frequency passband.

Furthermore, the two dimensional spatial frequency information also provides redundant frame to frame image spectrum information, and thereby increases the effective signal to noise ratio of the synthesized full aperture images spatial frequencies by approximately the square root of the number of redundant frames contributing to the the synthesized image's spatial frequency, a benefit unavailable to the one dimensional fanbeam, or tomographic, approach of the SPINRAD system. The SPINRAD system is applicable to imaging in the microwave frequency region, while the SPINAP system 10 is applicable to all wavelength bands from UV to microwave. Hence, the present invention incorporates independently arrived at concepts that build upon the SPINRAD approach, but add features that are critical to successful use in the optical wavelength regions. Table 1 provides a comparison of the SPINRAD and SPINAP systems.

TABLE 1

| Property | SPINAP | SPINRAD |
|---|---|---|
| Wavelength: | all optical and microwave | microwave only |
| Primary collector: | 1 or 2 dimensional curvature | 1 dimension curvature |
| Motion compensation: | LOS jitter scan smear 2 dimensional spatial frequency estimation | none none not available |
| Focus compensation: | yes | no |
| Non-isoplanatic (NI) compensation: | NI optics PSF NI rotation smear | none none |
| Moving target detection: & image reconstruction | potential | worse performance |
| Cloud cover performance: | poor (optical bands) | excellent |

Presented below is a discussion of the physical principles for a direct spatial frequency domain image synthesis approach first order model. The physical basis for the operation of the image synthesis processing methods 20 employed in the present invention may be understood by considering an illustrative example. In the following derivation of the full aperture image synthesizers, it is assumed that the number of strip aperture images, and the temporal registration of the strip aperture images measured by the imaging radiometer system 10 is sufficient to provide measurements of the entire spatial frequency passband of an equivalent full aperture system. For purposes of illustration, it is also assumed that the detectors respond instantaneously, and at least Nyquist spatial sampling for the optical systems spatial frequency cutoff is provided. The Nyquist sampling assumption implies that spatial aliasing effects can be neglected.

The detection and imaging nomenclature employed in the following discussion is as follows. In the absence of noise, individual detector output may be represented by $$O(\bar{r}_i, t_j) = \int d^2 r \int dt D(\bar{r}_i - r, t_j - t) I(\bar{r}, t)$$

where D is the detector response function, and I is the focal plane image. The instantaneous detector approximation assumes $D(\bar{r}_i - \bar{r}, t_j - t) \approx W(\bar{r})\delta(t - t_0)$ where $\delta$ is the Dirac delta function, and $W(r)$ is the detector spatial response function.

The focal plane image may be expressed in terms of the optical transfer function, OTF, and the scene spatial Fourier transform, $\hat{S}$, as $$I(\bar{r},t) = c \int d^2 F e^{2\pi i \bar{F} \cdot \bar{r}} OTF(F,t)\hat{S}(M\bar{F},t)$$

where c is a constant related to the total integrated intensity in the focal plane of the system 10, and M is the magnification of the optical system.

Performing a spatial Fourier transform on the noise free detector output yields expressions for the spatial frequency spectrum of the noise free strip aperture measurement at time t, $\hat{O}_S(\bar{F},t)$, and the ideal full aperture noise free measurement spectrum to be synthesized, $\hat{O}_F(\bar{F})$, respectively, $$\hat{O}_S(\bar{F},t) = \{\bar{I}_S A_{fpaS} \hat{W}_{0S}\} \hat{W}_{NS}(F,t) OTF_S(F,t) \hat{S}_N(M\bar{F}),$$

and $$\hat{O}_F(\bar{F}) = \{\bar{I}_F A_{fpaF} \hat{W}_{0F}\} \hat{W}_{NF}(\bar{F}) OTF_F(\bar{F}) \hat{S}_N(M\bar{F}).$$

In the preceding expressions and throughout the rest of the detailed description, the following definitions apply. The subscript F and S apply to the ideal full aperture system and the strip aperture optical systems, respectively. $S_N$ refers to the scene spatial frequency spectrum normalized by its value at zero spatial frequency, i.e., $\hat{S}_N(M\bar{F}) = \hat{S}(M\bar{F})/\hat{S}(M\bar{F}=0)$. $\hat{W}_N$ refers to the detector transfer function normalized by its value at zero spatial frequency, i.e. $\hat{W}_N(\bar{F}) = \hat{W}(\bar{F})/\hat{W}(\bar{F}=0)$. OTF is the optical transfer function of the optical system. $A_{fpa}$ is the effective focal plane array area. $\hat{W}_0$ is defined to be $\hat{W}(F=0)$. $\bar{I}$ is the focal plane image intensity averaged over the effective area of the focal plane, i.e.

$$\bar{I} = 1/A_{fpa} \int_{fpa} d^2 r\, I(\bar{r}).$$

The time dependence in the strip aperture optical transfer function describes the rotational motion of the telescope.

A simple approach capable of providing a noise free full aperture synthesized image while accounting for the number of frame to frame redundant spatial frequency measurements associated with the spatial frequency component of the desired full aperture image, is to define a spatial frequency domain synthesis operator, $\hat{\Lambda}(\bar{F})$, that can be applied to the totality of strip aperture measurements. The simple scene independent synthesis operator is given by, $$\hat{\Lambda}(F) = \frac{\{\bar{I}_A F A_{fpaF} \hat{W}_{0F}\}}{\{\bar{I}_S A_{fpaS} \hat{W}_{0S}\}} \frac{\hat{W}_{NF}(\bar{F}) OTF_F(\bar{F})}{\overline{\hat{W}_{NS}(\bar{F}) OTF_S(\bar{F})}}$$

for $\overline{\hat{W}_{NS}(\bar{F}) OTF_S(\bar{F})} \neq 0$.

In the previous expression, $\overline{\hat{W}_{NS}(\bar{F}) OTF_S(\bar{F})}$ is defined as $$\overline{\hat{W}_{NS}(\bar{F}) OTF_S(\bar{F})} = \frac{1}{N_{rf}(\bar{F})} \sum_{j=1}^{N_{rf}(\bar{F})} \hat{W}_{NS}(F,t_j) OTF_S(F,t_j)$$

where $N_{rf}(\bar{F})$ is the number of frame to frame strip aperture redundant spatial frequency measurements associated with the spatial frequency component of the desired full aperture image.

The noise free full aperture image spectrum is exactly retrieved by operating with the synthesizer, or synthesis operator $\hat{\Lambda}(\bar{F})$ defined above, on the redundancy weighted noise free strip aperture image spectrum measurement, i.e., $$\hat{\Lambda}(\bar{F}) \cdot \hat{O}_{Save}(\bar{F}) = \hat{O}_F(\bar{F}),$$

where the noise free redundancy weighted strip aperture image spectrum measurement is defined as, $$\hat{O}_{Save}(\bar{F}) = \frac{1}{N_{rf}(\bar{F})} \sum_{j=1}^{N_{rf}(\bar{F})} \hat{O}_S(\bar{F},t_j).$$

The full aperture image is then retrieved by performing an inverse Fourier transform on the noise free full aperture image spectrum.

The noise performance of the above-derived simple synthesis operator $\hat{\Lambda}(\bar{F})$ is as follows. In an operational system noise corrupts the measurement process, as well as, the synthesis process. The noise performance of the simple synthesis procedure may be quantified by comparing the rms error at each spatial frequency component of the synthesized full aperture image to the rms error at each spatial frequency associated with the true full aperture image. The error in the true full aperture image is also due to measurement noise. In the presence of noise, the spatial frequency spectrum of the individual frame strip aperture measurements, the idealized full aperture measurement, and the redundancy weighted strip aperture measurement are given by $$\hat{O}_{S-m}(\bar{F}, t_j) = \hat{O}_S(\bar{F}, t_j) + \hat{n}_S(\bar{F}, t_j),$$

$$\hat{O}_{F-m}(\bar{F}) = \hat{O}_F(\bar{F}) + \hat{n}_F(\bar{F}), \text{ and}$$

$$\hat{O}_{S-m\,ave}(\bar{F}) = \hat{O}_{S\,ave}(\bar{F}) + \hat{n}_{S\,ave}(\bar{F})$$

where $$\hat{n}_{S\,ave}(\bar{F}) = \frac{1}{N_{rf}(\bar{F})} \sum_{j=1}^{N_{rf}(\bar{F})} \hat{n}_{S\,ave}(\bar{F}, t_j)$$

and $\hat{n}(\bar{F}, t)$ denotes the measurement noise at spatial frequency $\bar{F}$ and frame time t. The time argument is intentionally left out of the full aperture spectrum expression, since comparisons will be to a single frame of the full aperture.

The synthesized full aperture image spectrum is obtained by operating with the synthesizer, synthesis operator $\hat{\Lambda}(\bar{F})$ defined above, on the noisy averaged redundancy weighted strip aperture measurement. The synthesized image spectrum is given by, $$\hat{O}_{synF}(\bar{F}) = \hat{\Lambda}(\bar{F}) \hat{O}_{S-m\,ave}(\bar{F}) = \hat{O}_F(\bar{F}) + \hat{\Lambda}(\bar{F}) \hat{n}_{S\,ave}(\bar{F})$$

The corresponding synthesized image spectrum error as a function of spatial frequency is $\epsilon_{syn}(\bar{F}) = \hat{\Lambda}(\bar{F})\hat{n}_{S\,ave}(\bar{F})$. Therefore, the synthesized image spectrum error variance for zero mean noise $<|\epsilon_{syn}(\bar{F})|^2> \equiv \sigma_{syn}^2(\bar{F}) = |\hat{\Lambda}(\bar{F})|^2 <|n_S(\bar{F})|^2>$ and the corresponding error variance for the idealized single frame full aperture measurement is $<|\epsilon_F(\bar{F})|^2> \equiv \sigma_F^2(\bar{F}) = <|\hat{n}_F(\bar{F})|^2>$.

A quantitative quality measure for the synthesis operation can therefore be defined as the ratio of the rms synthesis error to the full aperture rms single frame measurement error. The ratio of rms errors will be referred to as the synthesis error gain, or the error gain. The synthesis error gain is given by $$G_{error}(\overline{F}) = \frac{\sigma_{syn}(\overline{F})}{\sigma_F(\overline{F})} = \sqrt{|\hat{\Lambda}(\overline{F})|^2} \sqrt{\frac{|\hat{n}_{S\,ave}(\overline{F})|^2}{|n_F(\overline{F})|^2}} = \sqrt{\frac{\{\overline{T_{AF}A_{pfuF}\hat{W}_{0F}}\}^2}{\{\overline{T_{SA_{pas}}\hat{W}_{0S}}\}^2} \frac{|\hat{W}_{NF}(\overline{F})OTF_F(\overline{F})|^2}{|\hat{W}_{NS}OTF_S(\overline{F})|^2} \frac{|\hat{n}_{S\,ave}(\overline{F})|^2}{|\hat{n}_F(\overline{F})|^2}}.$$

For spatially and temporally uncorrelated measurement noise and identical spatial sampling the error gain can be expressed as $$G_{error}(\overline{F}) = \sqrt{\frac{\pi}{4}} \frac{SNR_{dF}}{SNR_{dS}} \frac{1}{\sqrt{N_{rF}(\overline{F})}} \frac{|\hat{W}_{NF}(\overline{F})||OTF_F(\overline{F})|}{|\hat{W}_{NS}(\overline{F})OTF_{S\,ave}(\overline{F})|} \sqrt{\frac{\{A_{fpaF}A_{dS}\}}{\{A_{fpaS}A_{dF}\}}}$$

where $SNR_d$ is the average individual detector signal to noise ratio, and $A_d$ is the area of an individual detector.

The performance comparison is a straight forward evaluation of the synthesis error gain at each spatial frequency. If $G_{error}(\overline{F})$ is greater than 1, the synthesized image is inferior to the ideal full aperture measurement. However, if $G_{error}(\overline{F})$ is less than 1, the synthesis is superior to the full aperture single frame measurement. Therefore system parameters can be selected that provide superior or comparable image quality to that of a single frame full aperture measurement. Since the magnitude of the optical transfer functions of the strip and full aperture systems are comparable, the benefits of using a continuous (or nearly continuous) strip aperture rather than well separated segments (or individual telescopes, as in a phased array) is demonstrated.

The following is a discussion of jitter compensation for image synthesis as it relates to a scene independent embodiment of the present invention. One of the features of the present SPINAP imaging radiometer system 10 and image synthesis processing method 20 is the ability to compensate, by post processing, for line of sight jitter, thereby greatly reducing the line of sight stability requirement. While the jitter compensation can be achieved in either the spatial or spatial frequency domain, it is most easily described in the spatial frequency domain. The basic approach depends upon the recognition that all individual strip aperture measurements have a common region of spatial frequency overlap. Depending on the system image acquisition geometry the common spatial frequency region between two temporally consecutive acquired images can be a significant portion of the strip aperture spatial frequency passband.

Figure 5:
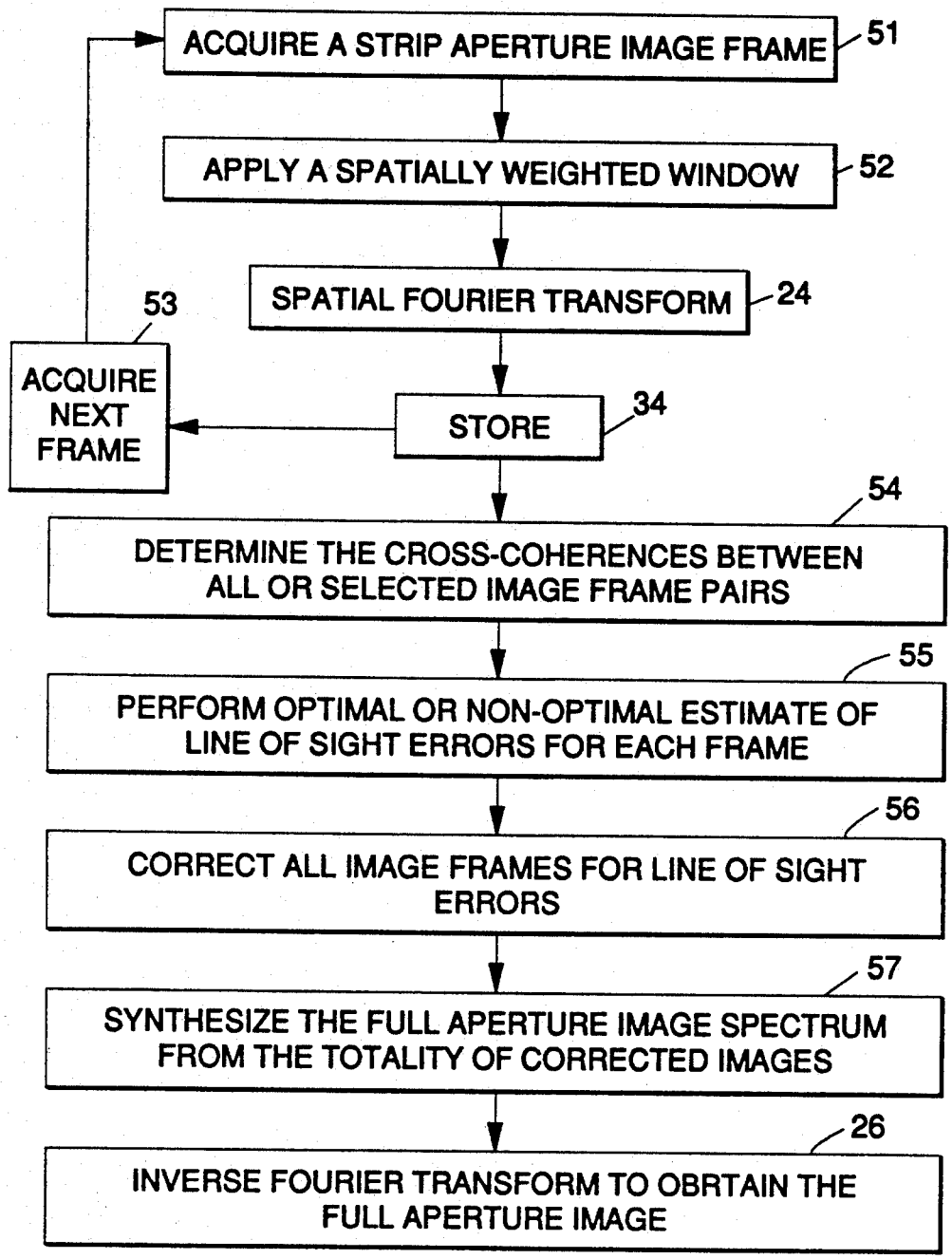
FIG. 5 illustrates another image synthesis processing method in accordance with the principles of the present invention that compensates for frame to frame strip aperture image misregistration.

The compensation approach used in the present method 20 is summarized by the following steps, taken in conjunction with FIG. 5 that compensates for frame to frame strip aperture image misregistration. More particularly, FIG. 5 illustrates another image synthesizing processing method 20 in accordance with the principles of the present invention. The image processing steps include: (1) Process the individual strip aperture images with a large spatially weighted "window", wherein the weighting in the window is designed to eliminate the non-common image data at the outer edges of the image, caused by line of sight jitter between frames (steps 51 and 52). (2) Perform a Fourier transform on each strip aperture image frame (step 24), store the results (step 34), and repeat for each frame (step 53). (3) Calculate the cross-coherence between strip aperture image frames for the common spatial frequency regions (step 54). (4) Use the phase of the cross-coherence between strip aperture frames to determine the line of sight shifts (step 55). (5) Compensate the strip aperture image spectra for the line of sight shifts by using the Fourier transform shift theorem (step 56). (6) Synthesize the full aperture image in the manner described above (step 57). (7) Inverse Fourier transform the synthesized spectrum to obtain a full aperture image (step 26).

The relationship between the phase of the cross-coherence function and the relative jitter information can be illustrated simply in the noise free case. The Fourier transforms of two strip aperture images acquired at times $t_1$ and $t_2$ having a relative line of sight displacement corresponding to $\Delta \overline{R}$ in the strip aperture image plane, and having a common weighted window transfer function $\hat{B}(\overline{F})$ are given by, $$\hat{O}_S(\overline{F},t_1) = \{\overline{T_S A_{pas}} \hat{W}_{QS}\} \hat{B}(\overline{F}) \hat{W}_{NS}(\overline{F},t_1) OTF_S(\overline{F},t_1) \hat{S}_M(M,\overline{F}), \text{ and}$$

$$\hat{O}_S(\overline{F},t_2) = \{\overline{T_S A_{pas}} \hat{W}_{QS}\} \hat{B}(\overline{F}) \hat{W}_{NS}(\overline{F},t_2) OTF_S(\overline{F},t_2) \hat{S}_M(M,\overline{F}) e^{2\pi \overline{F} \cdot \Delta \overline{R}_i}.$$

The cross-coherence is defined as the product of the Fourier transform of one frame with the complex conjugate of the Fourier transform of the second frame. Either frame can be first or second. The product of the Fourier transforms becomes, $$\hat{O}_S(\overline{F},t_1) \cdot \hat{O}_S^*(\overline{F},t_2) = \hat{W}_{NS}(\overline{F},t_1) \hat{W}_{NS}(\overline{F},t_2) \{ \overline{T_S A_{pas}} \hat{W}_{QS}\}^2 |\hat{B}(\overline{F})|^2 |\hat{S}_M(M,\overline{F})|^2 OTF_S(\overline{F},t_1) OTF_S(\overline{F},t_2) e^{-2\pi \overline{F} \cdot \Delta \overline{R}_i}.$$

As can be seen from the last equation, for diffraction limited strip aperture optical systems the phase of the cross-coherence is related to the relative line of sight displacement between the frames. Therefore, the ratio of the real and imaginary parts of the cross coherence provides a means to obtain a scene independent line of sight shift estimate.

More general image synthesis approaches for the present synthesis processing method 20 are as follows. The simple synthesizer described previously is not a noise optimal procedure, and may not accommodate all apriori and aposteriori knowledge. An optimal synthesizer can be obtained by recognizing the entire strip aperture measurement space (spatial and time domain measurements, or their spatial and temporal Fourier transforms) contains redundant measurement information. Therefore, an optimal estimation procedure that accounts for the signal, noise, measurement statistics and the physical implementation of the measurement process will provide superior synthesis performance when compared to the simple synthesizer described previously. The procedure is straight forward and uses the nomenclature summarized in Table 2.

Table 2 summarizes the Gauss-Markov estimation procedure. The braces $< \ldots >$ refer to ensemble averaging over noise, signal, and measurement statistics.

The superscripts t and −1 refer to the transpose and inverse of a matrix, respectively.

TABLE 2

| Variable | Meaning |
|---|---|
| n | Number of measurements |
| k | Number of estimates |
| M | n × 1 matrix (vector) of measurements |
| X | k × 1 matrix (vector) of true (or target) values to be estimated |
| $\tilde{X}$ | Estimate of the true values |
| $E^2 = <(X - \tilde{X})^t(X - \tilde{X})>$ | The mean squared error |
| $<(X - \tilde{X})(X - \tilde{X})^t>$ | The error covariance matrix. The mean squared error is related to the error covariance matrix by the trace, i.e. $E^2 =$ trace $\{<(X - \tilde{X})(X - \tilde{X})^t>\}$ |
| $G = <XM^t>[<MM^t>]^{-1}$ | The estimation matrix. G is determined such that the mean square error between the true values and the estimated values is minimized, no bias errors are present, and $\tilde{X} = GM$. |
| $E^2 = $ trace $\{<XX^t> - <XM^t>[<MM^t>]^{-1} <XM^t>^t\}$ | |

The basic technique determines a synthesis operator (matrix) based on all apriori and aposteriori knowledge of the optical system and measurement process, including, but not limited to, parameters such as: detector temporal and spatial response function; strip aperture point spread function; detector integration times; rotation velocity; optical system field point dependencies; full aperture system properties; noise statistics; and scene statistics (if appropriate), and if the detector array is nominally rotating or stationary relative to the spinning aperture. The optimal procedures in the spatial and spatial frequency domain are formally equivalent but different in detail.

A more general spatial frequency domain image synthesis approach for synthesis processing method 20 is as follows, taken in conjunction with FIG. 6. The more general spatial frequency domain image synthesis method estimates a particular spatial frequency image component, or spatial frequency image components in the full aperture optical system's passband in accordance with the following steps. (1) Establishing a set of n spatial frequency measurements in the neighborhood of k spatial frequency image components, or spatial frequency image components to be estimated (step 61). The term "in the neighborhood" refers to a temporal, as well as, a spatial frequency region in the vicinity of the spatial frequency image component, or components, to be estimated. The neighborhood can include the entire spatial frequency passband of the full aperture, and all the time domain measurements, or any fraction thereof. (2) Incorporating apriori and aposteriori knowledge concerning the strip aperture sensor system, the full aperture sensor system, the measurement process, and the noise and signal statistics into the Gauss-Markov estimation matrix, G (step 62). If scene statistical information is known it may also be incorporated. (3) Applying the Gauss-Markov estimation matrix to the measured neighborhood of points to obtain the estimate of the selected spatial frequency image components, or component, of the full aperture image (step 63). (4) Repeating the above process until all spatial frequency image components in the passband of the full aperture have been estimated (step 64). (5) Obtaining the final synthesized image by performing an inverse Fourier transform (step 65).

A more general spatial domain image synthesis approach for the synthesis processing method 20 is as follows, taken in conjunction with FIG. 7. The more general spatial domain image synthesis method is similar to the optimal spatial frequency domain technique. The basic technique generates the synthesis operator (matrix) for transforming the idealized strip aperture spatial and temporal measurements associated with the strip aperture's point spread function to measurements obtained using the full aperture point spread function in accordance with the following steps. (1) Establishing a set of n spatial measurements in the neighborhood of the spatial image components, or component, to be estimated (step 71). The term "in the neighborhood" refers to a temporal, as well as, a spatial region in the vicinity of the point, or points, to be estimated. The neighborhood can include the entire spatial region of the focal plane, and all the time domain measurements, or any fraction thereof. (2) Incorporating apriori and aposteriori knowledge concerning the strip aperture sensor system, the full aperture sensor system, the measurement process, and the noise and signal statistics into the Gauss-Markov estimation matrix, G (step 72). (3) Applying the Gauss-Markov estimation matrix to the measured neighborhood of points to obtain the estimate of the selected spatial image components, or component (step 63). (4) Repeating the process until all spatial components in the full aperture image have been determined (step 64). The Gauss-Markov estimation matrix must be calculated for each of the discrete spatial, or spatial frequency components to be estimated in the full aperture passband. However, the global estimation matrix, which is the totality of estimation matrices, may only be calculated once and applied to every acquired set of imagery.

Figure 6:
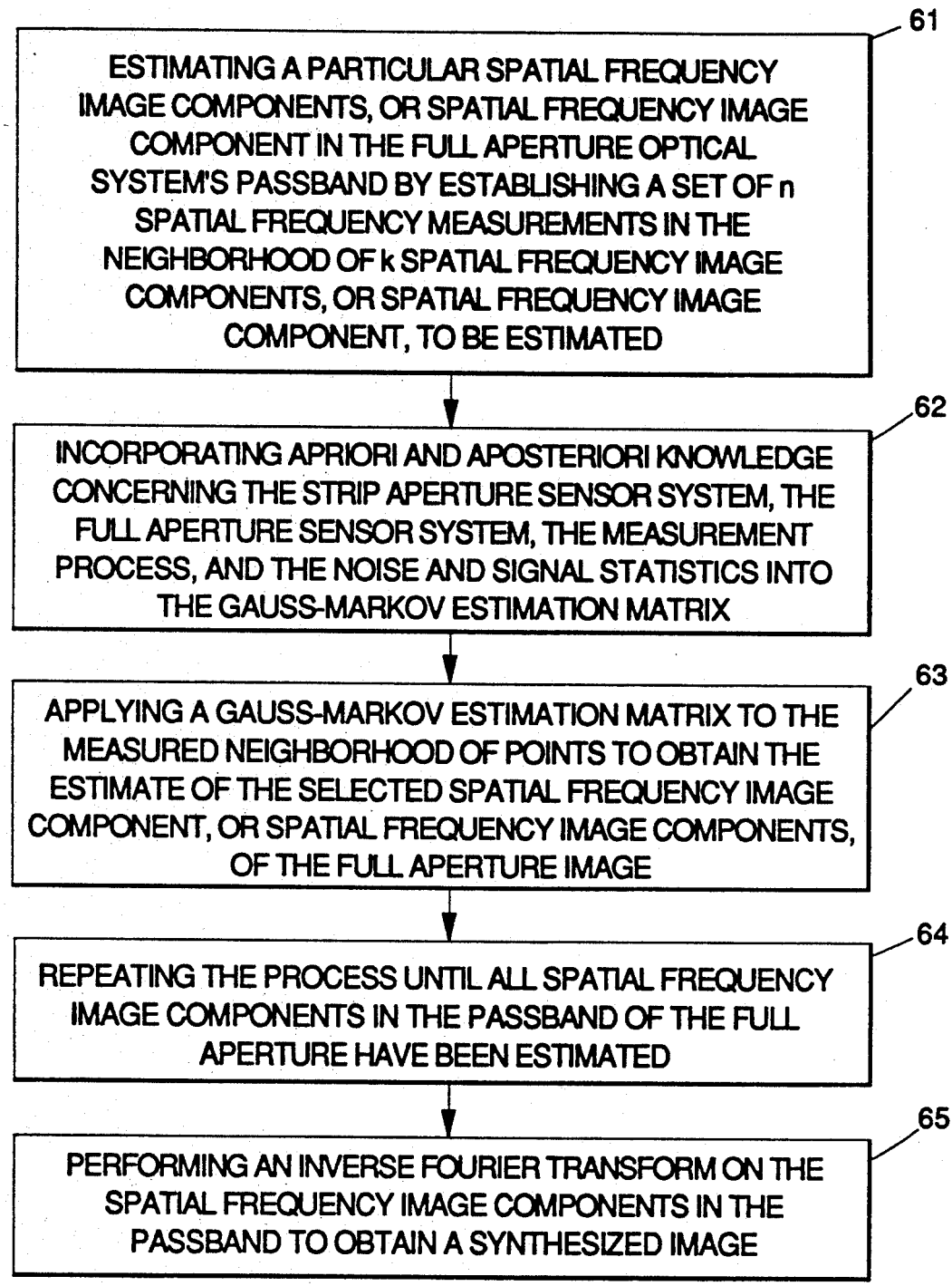
FIG. 6 illustrates yet another image synthesis processing method in accordance with the principles of the present invention that performs image synthesis in the spatial frequency domain and compensates for apriori and aposteriori known error sources.
Figure 7:
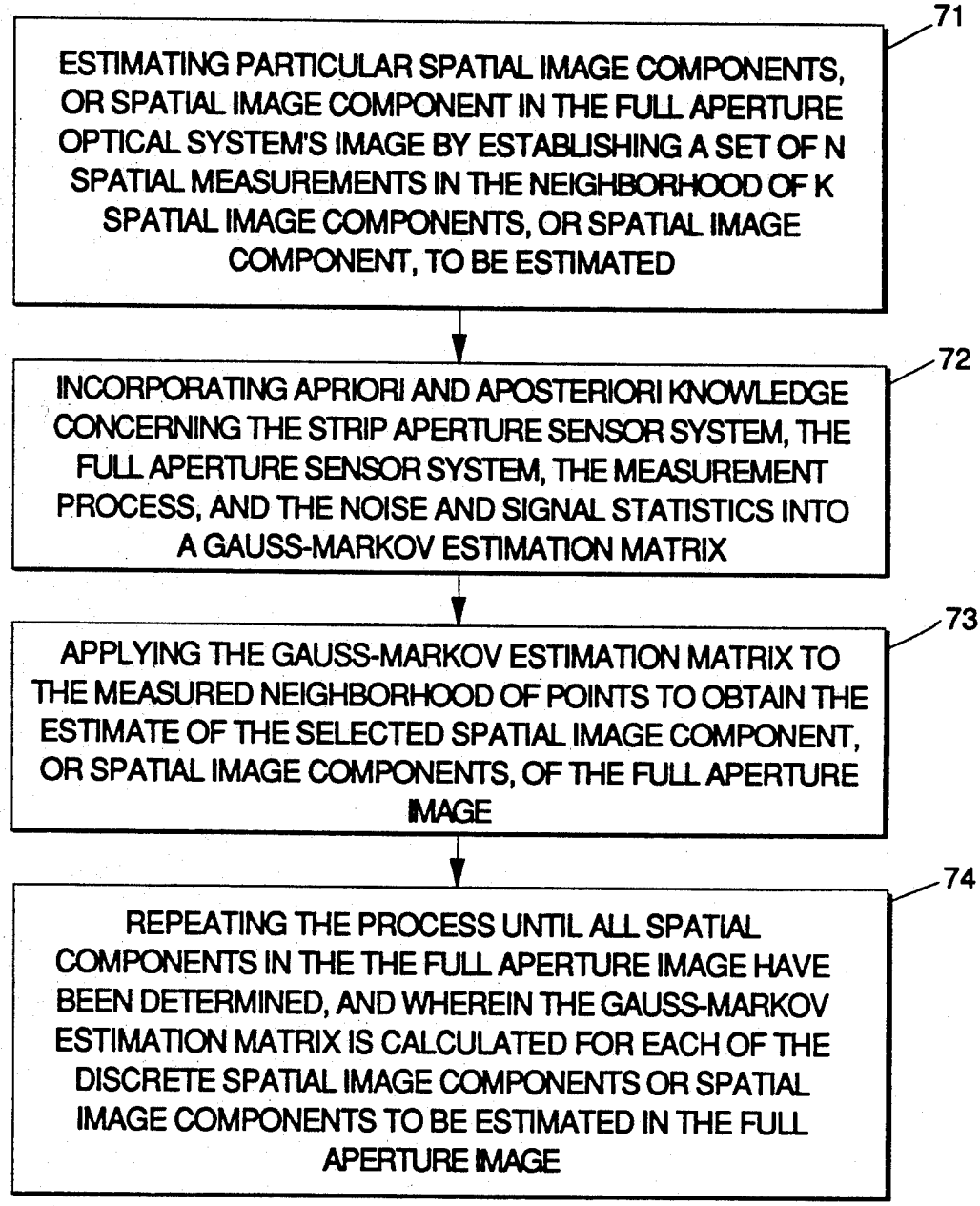
FIG. 7 illustrates yet another image synthesis processing method in accordance with the principles of the present invention that performs image synthesis in the spatial domain and compensates for apriori and aposteriori known error sources.
Figure 8:
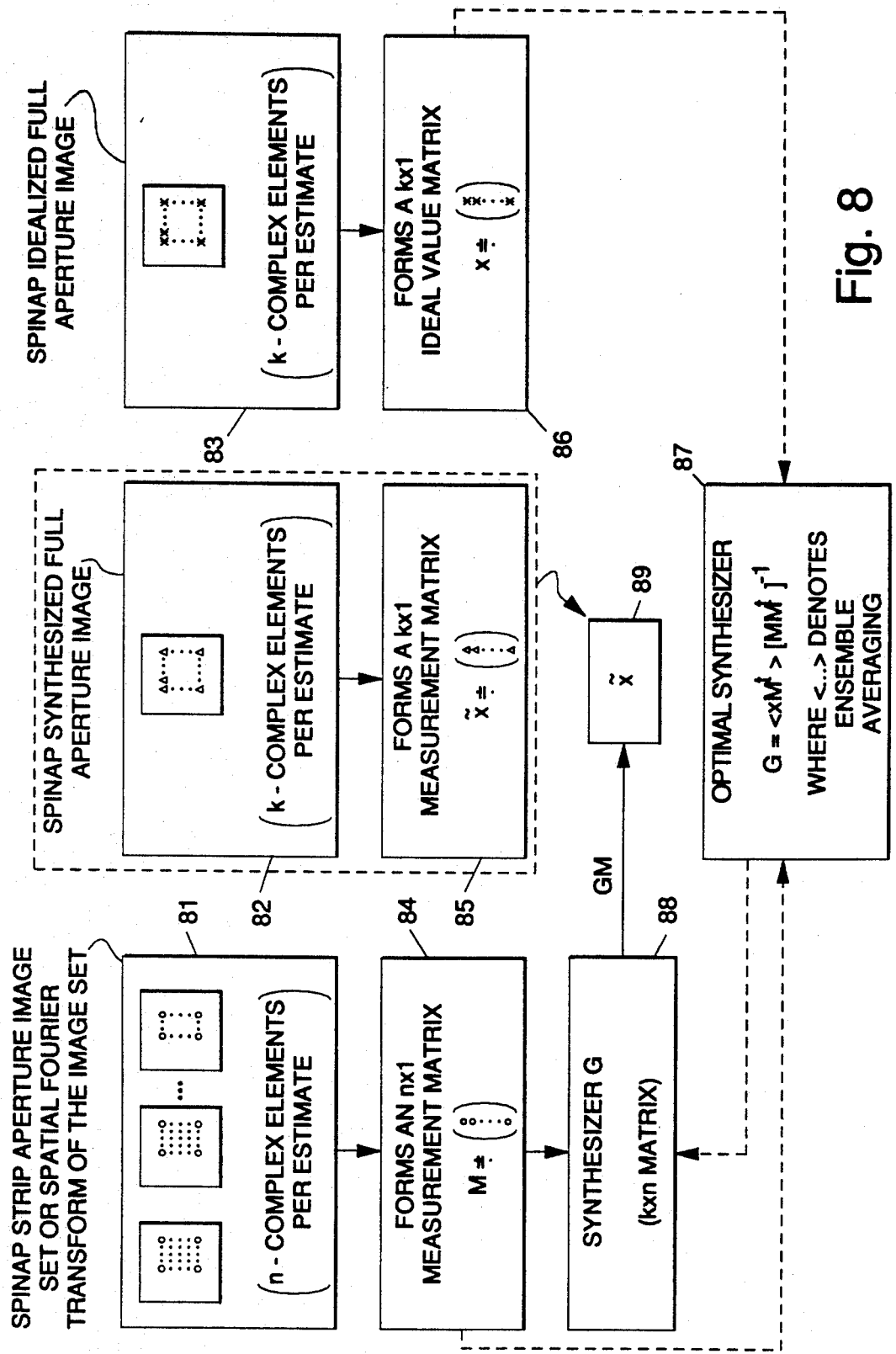
FIG. 8 illustrates one embodiment of the image synthesis processing method illustrated in FIGS. 6 and 7.

Additional understanding regarding the above spatial domain image synthesis approaches shown in FIGS. 6 and 7 may be had with reference to FIG. 8. FIG. 8 illustrates a pictorial representation of the present synthesis method for optimal and suboptimal image synthesizers. In FIG. 8, the circles denote the measured image or image spectrum components to be used by the synthesizer, the triangles denote full aperture image or image spectrum components generated by the synthesizer and the asterisk (*) denotes the true value of the image or image spectrum to be generated by the synthesizer.

As may be seen in FIG. 8, an image set, full aperture image or image spectrum components, and true value of the image or image spectrum are generated as illustrated by processing blocks or steps 81 and 89. A measurement matrix M is formed in step 84, an output matrix $\tilde{X}$ is formed in step 85, and an ideal value matrix x is formed in step 86. FIG. 8 depicts both the image synthesis process and a scheme to generate an optimal synthesizer. Steps 81, 84, 88 and 89 comprise the image synthesis procedure, whereby the strip aperture measurements 81 are used to form the measurement matrix M (step 84), and are matrix multiplied by a predetermined synthesizer G (step 88), to form full aperture image estimates comprising the output matrix $\tilde{X}$ (step 89). Blocks 82 and 85 represent the contents of the output matrix $\tilde{X}$. An optimal synthesizer is generated by modeling the measurement processes producing a set of modeled measurements (step 81) that are used to form the measurement matrix (step 84). The idealized full aperture image error free measurements are modeled (step 83) to produce an ideal measurement matrix (block 86). The statistics of the measurement process including all apriori and aposteriori information is then used to generate the optimal synthesizer 87.

Figure 9:
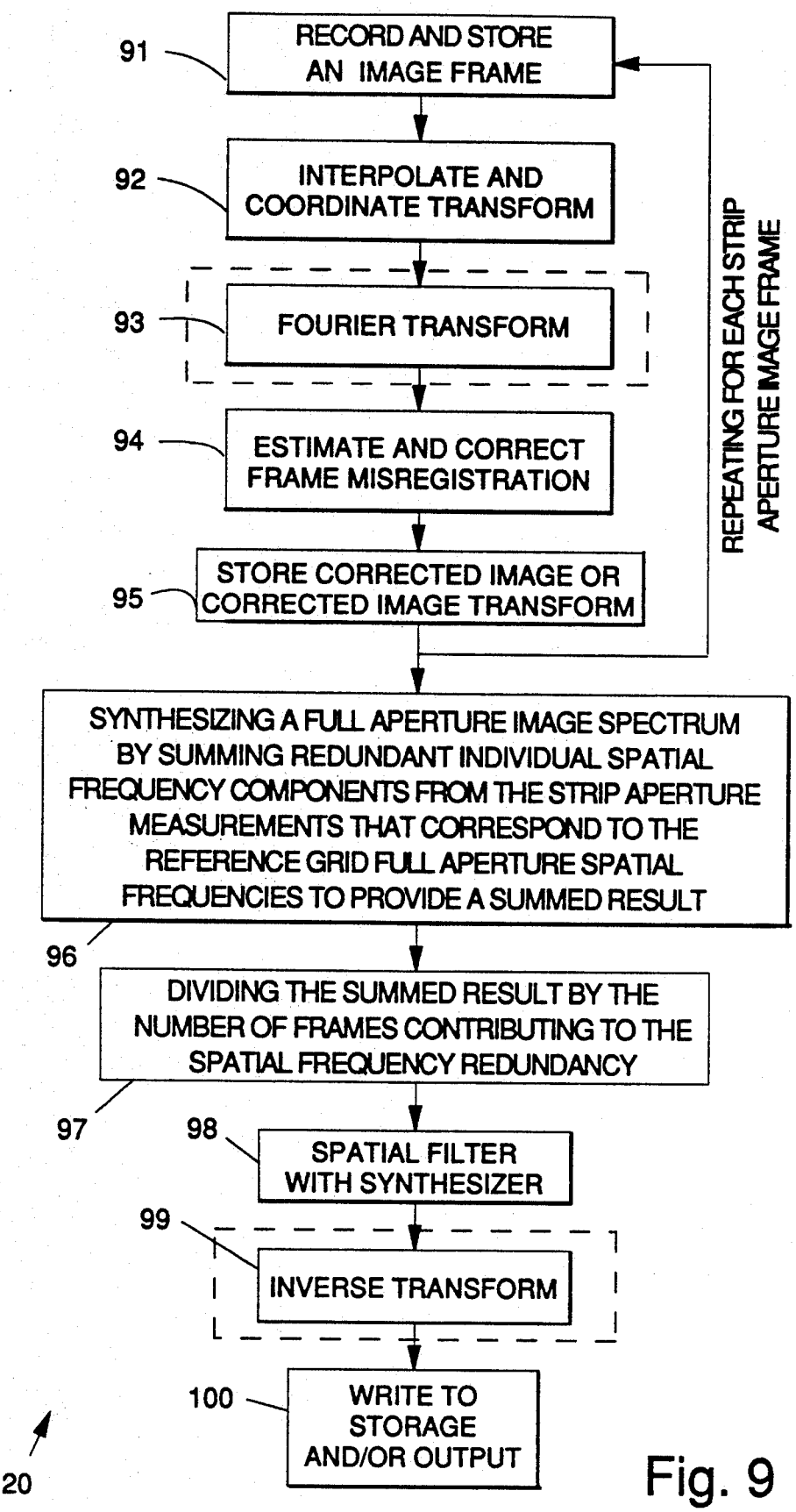
FIG. 9 illustrates yet another image synthesis processing method illustrated in FIG. 5, and implemented to produce the images shown in FIGS. 13a-13c.

A more detailed understanding of the method 20 of the present invention may be had with reference to FIG. 9 which shows a method 20 that compensates for strip aperture frame to frame misregistration. The method 20 shown in FIG. 9 comprises recording and storing an image frame in step 91. Then the image frame data is interpolated and coordinate transformed in step 92. The interpolated and coordinate transformed data is then optionally Fourier transformed in step 93. Then, frame misregistration is estimated and corrected in step 94. The corrected image or corrected image transform is then stored in step 95. The above steps are then repeated for each strip aperture image. Then a full aperture image spectrum is synthesized in step 96. This is achieved by summing redundant individual spatial frequency components from the strip aperture measurements that correspond to a reference grid full aperture spatial frequencies to provide a summed result. The summed result is divided by the number of frames contributing to the spatial frequency redundancy in step 97. The divided summed result is spatially filtered using the synthesizer in step 98. Then, if required, the spatially filtered result is inverse Fourier transformed in step 99 to produce an image. The image is then stored or otherwise recorded in step 100.

Figure 10:
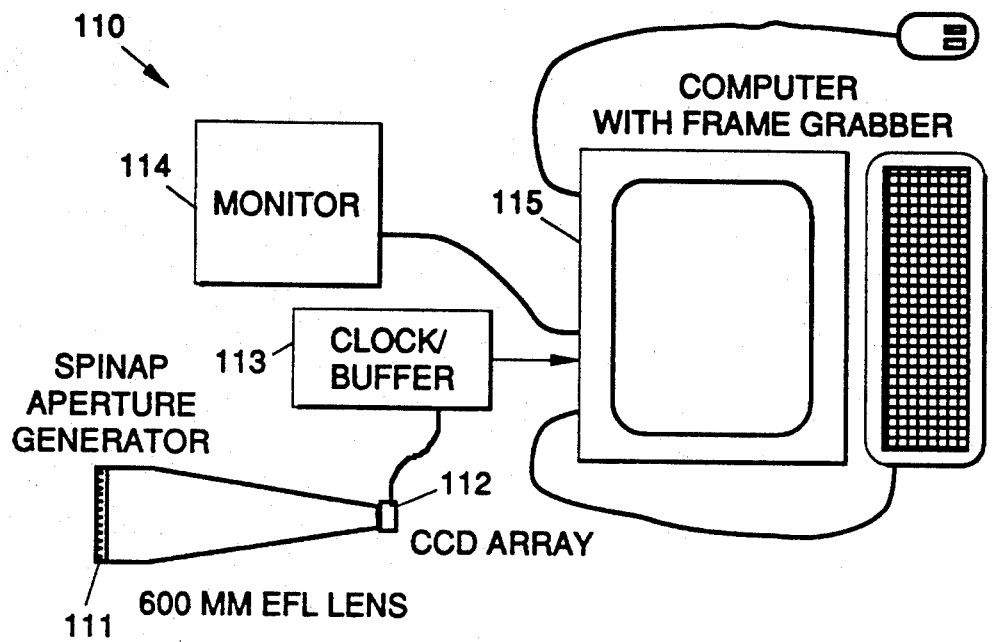
FIG. 10 illustrates an experiment that was used to demonstrate the present invention.
Figure 11:
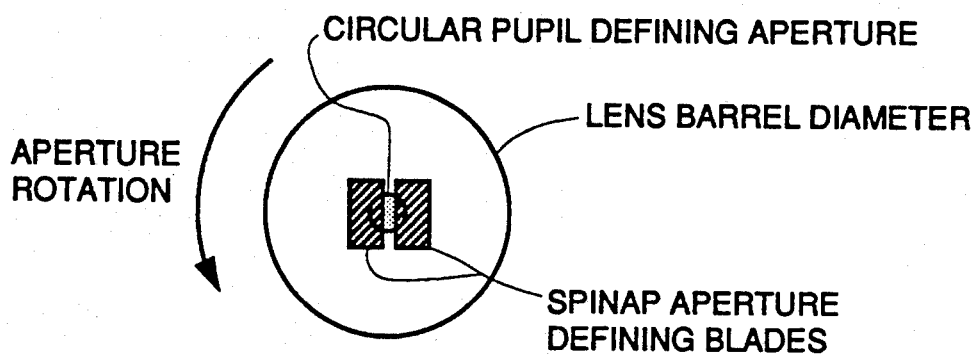
FIG. 11 illustrates an aperture generator employed in the experiment of FIG. 5.

The SPINAP imaging system 10 has been verified by simulation and experiment. In addition, the SPINAP system 10 and processing method 20 have been reduced to practice by means of a scaled experiment. FIG. 10 illustrates an experimental arrangement used to demonstrate the present invention. FIG. 11 illustrates an aperture generator employed in the experimental arrangement of FIG. 10. The arrangement 110 was comprised of a well-corrected 0.6 meter focal length camera lens, having a circular aperture 111 directly in front of the lens. The circular aperture 111 provide a diffraction limited image of a size appropriate for correct spatial sampling by a detector array 112. Strip apertures 12 having selected SPINAP aspect ratios were formed by two razor blades mounted to the circular aperture 111, as shown in FIG. 11. The entire aperture-razor blade assembly was rotated to provide the aperture samples needed to reconstruct an image equivalent in quality to that produced by a full circular aperture. The detector array 112 was a CCD array with 30 $\mu$m by 18 $\mu$m sized detectors. An image was extracted using a clock buffer 113 and a computer comprising a frame grabber 115 to form an 8 bit 256×256 pixel image on a monitor 114 and saved on a personal computer for post processing.

The long to short dimension ratio for the SPINAP aperture, referred to as the strip aperture's aspect ratio, was 5.13 to 1. The strip aperture's aspect ratio provided complete sampling of the spatial frequency spectrum of the full aperture with eight angularly displaced orientations. Eight images were taken with the aperture rotated 22.5 degrees between each frame to form a complete set for a given scene. Several scenes were imaged by Nyquist sampling of the strip aperture optical system passband, $F_{number}\lambda$/pixel spacing=2, and several scenes were imaged by undersampling the optical system passband, $F_{number}\lambda$/pixel spacing=1. As a control reference, a full circular aperture image was also recorded with the signal attenuated to the levels of a single image from the SPINAP set.

Figure 12A:
FIGS. 12a and 12b show a comparison of a synthesized image produced using the present invention and an equivalent full aperture true image, respectively, as demonstrated during a reduction to practice experiment.
Figure 12B:

Results of test using the above described experimental arrangement are as follows. In all cases, the apparent sharpness and actual resolution of the SPINAP images were virtually identical to the full aperture reference images. FIGS. 12a and 12b show a comparison of the synthesized images produced using the present invention and a comparably sized full aperture image. In a few images, artifacts were introduced at the sites of specular highlights. The artifacts were the result of illumination changes from one frame to the next. The illumination variation was caused by the sun being intermittently obscured by clouds. Each set of data took several minutes to acquire using the demonstration apparatus. More rapid data collection, and a small number of seconds per data set, is practical with current technology hardware, and would eliminate the time varying nature of the illumination from the experiment.

The presence and origin of the artifacts provided a demonstration of the usefulness of the SPINAP sensor and synthesis method as a change detection and exploitation sensor. For imaging scenarios in which scene elements are changing from frame to frame, additional post processing will enable the exploitation of the observed effects for change detection, as well as for determination of the scene's moving element's motion parameters, and reconstruction of the scene's moving element with motion smear effects removed.

Figure 13A:
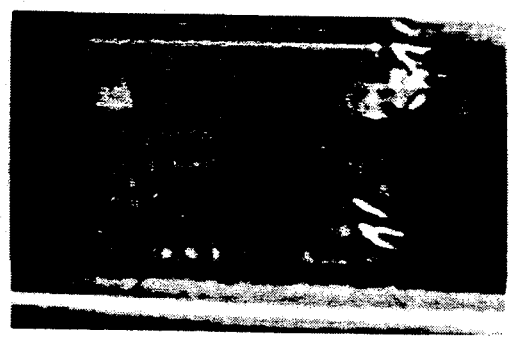
Figure 13B:
Figure 13C:
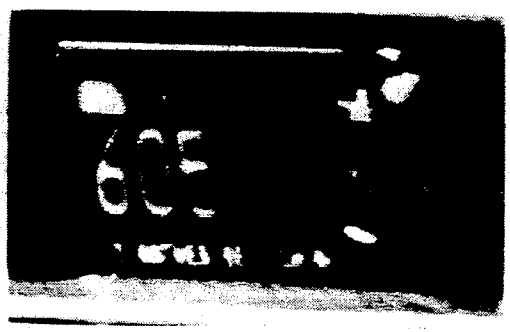
FIG. 13c shows a true full aperture image without jitter.

The frame to frame motion correction provided by the present system and method of the present invention was also verified. FIGS. 13a and 13b show an image before jitter is removed and with jitter removed by means of the present invention, respectively. FIG. 13c shows a reference image having no jitter. Image motion was simulated using image frames acquired during the experimental demonstration. The image in each strip aperture frame was displaced by up to 10 pixels in random directions. The image frames were used to synthesize the full aperture image without jitter compensation to form the "before jitter removal" image in FIG. 13a. The image motion in each frame was then estimated using a cross-coherence technique. The estimates were used to correct the image position of the individual strip aperture images during the SPINAP synthesis method 20 to form the "with jitter removed" image depicted in FIG. 13b. As can be seen in the figures, the effects of frame to frame misregistration were virtually eliminated.

The results of the experiment show that the SPINAP system 10 and processing method 20 can provide high resolution imagery from a high altitude lightweight, space based optical system. More specifically, the following were verified in the tests. The output of a rotating strip aperture optical system may be combined using SPINAP processing procedures to produce image resolution equal to a full circular aperture optical system with an aperture diameter equal to the long dimension of the SPINAP aperture. Image motion between frames can be estimated and compensated for during the image reconstruction process.

Thus there has been described a new and improved spinning aperture imaging radiometer system and methods that synthesize full aperture radiometric images while removing jitter, thereby providing improved high quality, high resolution imagery. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A spinning strip radiometer system comprising:
   a telescope comprised of a rotating strip aperture that rotates around an optical axis and that produces temporally sequential images of a scene;
   a two-dimensional detector array for detecting images located in the focal plane of the telescope;
   a signal processor coupled to the detector array for recording a plurality of image frames of the image scene as the strip aperture rotates around the optical axis of the telescope, and for synthesizing a full circular aperture image from the recorded image frames.

2. The spinning strip radiometer system of claim 1 wherein one dimension of the rotating strip aperture is substantially identical to a diameter of a full aperture optical system to be synthesized.

3. The spinning strip radiometer system of claim 1 wherein the spinning strip aperture telescope comprises a multiple-strip aperture in which several radial strips are used as an image acquisition sensor.

4. The spinning strip radiometer system of claim 1 wherein the spinning strip aperture telescope comprises a phased array in which two or more telescopes are coherently joined to produce the images used during image synthesis.

5. The spinning strip radiometer system of claim 1 wherein the spinning strip aperture telescope comprises a sparse phased array comprising a plurality of telescopes, and wherein rotation of the telescopes in conjunction with predetermined variations of the separation distances between telescopes are used to fill gaps in the spatial frequency passband of the measurements.

6. The spinning strip radiometer system of claim 1 wherein the signal processor is adapted to:
   record an image frame as the spinning strip aperture rotates about its optical axis;
   interpolate the data in the image frame;
   perform a coordinate transformation on the data in the image frame;
   Fourier transform the data in the image frame;
   estimate the frame to frame misregistration of the data in the image frame;
   correct for misregistration of the data in the image frame;
   add the corrected image frame data to a buffer;
   repeat the above steps for each image frame, and wherein after all image frames have been processed and added to the buffer, the data in the buffer is representative of image information comprising a full aperture image;
   spatially filter the image data representative of the full aperture image information with a synthesizer; and
   inverse Fourier transform the spatially filtered image data to provide a synthesized full aperture image.

7. A spinning strip radiometer system that comprises:
   a rotating strip aperture telescope that comprises an optical axis and that produces temporally sequential images of a scene;
   a two-dimensional detector array for detecting images located in the focal plane of the telescope;
   a rotation compensation means for producing a stationary image by compensating for the image rotation during the integration time of the detector; and
   a signal processor for recording a plurality of image frames of a scene imaged by the telescope as it rotates around the optical axis of the telescope, and for synthesizing a full circular aperture image from the recorded image frames;
   whereby the spinning strip radiometer system synthesizes a circular full aperture radiometric image from a plurality of rotating strip aperture image measurements, while compensating for random line of sight errors between individual strip aperture images to provide a high resolution image.

8. The system of claim 7 wherein the rotation compensation means counter-rotates the image during the integration time of the detector comprising the detector array to provide a stationary image.

9. The spinning strip radiometer system of claim 7 wherein a longest dimension of the rotating strip aperture telescope is substantially identical to a diameter of a full aperture optical system to be synthesized.

10. The spinning strip radiometer system of claim 7 wherein the spinning strip aperture telescope comprises a multiple-strip aperture in which several radial strips are used as an image acquisition sensor.

11. The spinning strip radiometer system of claim 7 wherein the spinning strip aperture telescope comprises a phased array in which two or more telescopes are coherently joined to produce the images used during image synthesis.

12. The spinning strip radiometer system of claim 7 wherein the spinning strip aperture telescope comprises a sparse phased array comprising a plurality of telescopes, and wherein rotation of the telescopes in conjunction with predetermined variations of the separation distances between telescopes are used to fill gaps in the spatial frequency passband of the measurements.

13. The spinning strip radiometer system of claim 7 wherein the rotation compensation means prevents rotational smear during integration time of the detectors of the array.

14. An image synthesizing method for use with a spinning strip aperture radiometer that records image data as a spinning strip aperture rotates about its optical axis, said method comprising the steps of:
   recording an image frame as the spinning strip aperture rotates about an optical axis;
   interpolating the data in the image frame;
   performing a coordinate transformation on the data in the image frame;
   Fourier transforming the data in the image frame;
   estimating the frame to frame misregistration of the data in the image frame;
   correcting for misregistration of the data in the image frame;
   adding the corrected image frame data to a buffer;
   repeating the above steps for each image frame, and wherein after all image frames have been processed and added to the buffer, the data in the buffer is representative of the full aperture image information;
   spatially filtering the image data representative of the full aperture image information with a synthesizer; and
   inverse Fourier transforming the spatially filtered image data to provide a synthesized image.

15. An image synthesizing method for use in an imaging system having a spinning strip aperture telescope that rotates around its optical axis, a two-dimensional detector array for detecting images located in the focal plane of the telescope, rotation compensation means for providing a stationary image during the integration time of detectors of the detector array, and a signal processor for recording a plurality of image frames of a scene imaged by the telescope as it rotates around the optical axis of the telescope, and for synthesizing a full circular aperture image from the recorded image frames, wherein the synthesizing method comprises the following steps:

recording and storing an image frame;

interpolating and coordinate transforming the stored frame such that it corresponds to a reference coordinate grid of the synthesized image;

spatially Fourier transforming and storing the data in the image frame;

recording and storing the remainder of the image frames;

estimating the frame-to-frame misregistration of the data due to random line of sight errors;

correcting a selected one of the strip aperture images, or its Fourier transform, for the line of sight errors and storing the corrected image or Fourier transform;

sequentially repeating the preceding steps for each strip aperture image frame; and after all image frames have been processed and saved:

synthesizing a full aperture image spectrum by summing redundant individual spatial frequency components from the strip aperture measurements that correspond to the reference coordinate grid of the full aperture spatial frequencies to provide a summed result;

dividing the summed result by the number of frames contributing to the spatial frequency redundancy;

spatial frequency filtering the resultant data using an appropriate spatial frequency synthesizer to produce a synthesized image spectrum; and inverse Fourier transforming the synthesized image spectrum to provide a full aperture image.

16. The image synthesizing method of claim 15 wherein information comprising two dimensional spatial frequency content of each frame is used to estimate frame to frame line of sight errors using predetermined cross-coherence techniques, and the line of sight error estimates are used to register predetermined aperture images.

17. The image synthesizing method of claim 16 wherein the predetermined aperture images comprise individual strip aperture images.

18. The image synthesizing method of claim 16 wherein the predetermined aperture images comprise all of the strip aperture images, and the line of sight error estimates are used to noise optimally register all of the strip aperture images.

19. The image synthesizing method of claim 15 wherein information comprising two dimensional spatial frequency content of each frame is used to estimate frame to frame line of sight errors using predetermined cross-correlation or cross-coherence techniques, and the line of sight error estimates are used to register individual strip aperture images.

20. The image synthesizing method of claim 19 wherein the predetermined aperture images comprise all of the strip aperture images, and the line of sight error estimates are used to noise optimally register all of the strip aperture images.

21. The image synthesizing method of claim 15 wherein the two dimensional spatial frequency information provides redundant frame to frame image spectrum information, that increases the effective signal to noise ratio of the spatial frequencies of the synthesized full aperture image.

22. The method of claim 15 wherein the step of correcting for misregistration of the data in the image frame comprises the steps of:

processing the individual strip aperture images with a spatially weighted window, wherein the weighting in the window is adapted to eliminate non-common image data at outer edges of the image caused by line of sight jitter between image frames;

performing a Fourier transform on each strip aperture image frame;

calculating the cross-coherence between strip aperture image frames for the common spatial frequency regions;

determining the line of sight shift between image frames using the phase of the cross-coherence between strip aperture frames;

compensating the strip aperture image spectra for line of sight shifts by using a predetermined Fourier transform shift theorem; and synthesizing the full aperture image.

23. The method of claim 15 wherein the step of synthesizing the image frame comprises the step of:

processing the image data using an estimation procedure that accounts for signal, noise, and measurement statistics and processes to optimally use redundant measurement information.

24. The method of claim 15 wherein the step of synthesizing the image frame comprises the steps of:

estimating a particular spatial frequency image components, or spatial frequency image component in the full aperture optical system's passband by:

establishing a set of n spatial frequency measurements in the neighborhood of the k spatial frequency image components, or spatial frequency image component, to be estimated, where the term "in the neighborhood" refers to a temporal and spatial frequency region in the vicinity of the frequency image component, or frequency image components, to be estimated, and wherein the neighborhood includes an entire spatial frequency passband of the full aperture, all the time domain measurements, or any fraction thereof;

incorporating apriori and aposteriori knowledge concerning the strip aperture sensor system, the full aperture sensor system, the meausurement process, and the noise and signal statistics into the Gauss-Markov estimation matrix;

applying the Gauss-Markov estimation matrix to the measured neighborhood of points to obtain the estimate of the selected spatial frequency image component, or spatial frequency image components, of the full aperture image;

repeating the process until all spatial frequency image components in the passband of the full aperture have been estimated; and performing an inverse Fourier transform on the spatial frequency image components in the passband to obtain a synthesized image.

25. The method of claim 15 wherein the step of synthesizing the image frame comprises spatial domain image synthesizing of the image frame comprising the steps of:

generating an estimation matrix for transforming idealized strip aperture spatial and temporal measurements associated with the strip aperture's point spread function to measurements obtained using a full aperture point spread function by:

establishing a set of n spatial measurements in the neighborhood of the spatial image component, or spatial image components, to be estimated, wherein the term "in the neighborhood" refers to a temporal, as well as, a spatial region in the vicinity of the point, or points, to be estimated, wherein the neighborhood can include the entire spatial region of the focal plane, and all the time domain measurements, or any fraction thereof;

incorporating apriori and aposteriori knowledge concerning the strip aperture sensor system, the full aperture sensor system, the measurement process, and the noise and signal statistics into the Gauss-Markov estimation matrix;

applying the Gauss-Markov estimation matrix to the measured neighborhood of points to obtain the estimate of the selected spatial image component, or spatial image components; and repeating the process until all spatial components in the full aperture image have been determined, and wherein the Gauss-Markov estimation matrix is calculated for each of the discrete spatial image components or spatial image components to be estimated in the full aperture image.

26. An image synthesizing method for use in an imaging system having a spinning strip aperture telescope that rotates around its optical axis, a two-dimensional detector array for detecting images located in the focal plane of the telescope, and a signal processor for recording a plurality of strip image frames of a scene imaged by the telescope as it rotates around an optical axis, and for synthesizing a full circular aperture image from the recorded image frames, wherein the synthesizing method comprises the following steps:

recording and storing a strip image frame;
interpolating and coordinate transforming the stored frame such that it corresponds to a reference coordinate grid of the synthesized image;
storing the data in the strip image frame;
recording and storing another image frame;
estimating the frame-to-frame misregistration of the data due to random line of sight errors;
correcting a selected one of the strip aperture images, or their Fourier transforms, for their line of sight errors and storing the corrected images or Fourier transforms, respectively;
sequentially repeating the preceding steps for each strip aperture image frame; and
after all image frames have been corrected for frame to frame registration errors and saved:
synthesizing a full aperture image or image spectrum using statistically optimal synthesizers.

27. The image synthesizing method of claim 26 wherein information comprising two dimensional spatial frequency content of each frame is used to estimate frame to frame line of sight errors using cross-coherence (or cross-correlation) techniques, and the line of sight errors estimates are used to register individual strip aperture images or noise optimally register all of the strip aperture images.

28. The image synthesizing method of claim 26 wherein the two dimensional spatial frequency information provides redundant frame to frame image spectrum information, that increases the effective signal to noise ratio of the spatial frequencies of the synthesized full aperture image.

29. The method of claim 26 wherein the step of synthesizing the image frame comprises the step of:
processing the image data using an estimation procedure that accounts for signal, noise, and measurement statistics to optimally use redundant measurement information.

30. The method of claim 26 wherein the step of synthesizing the image frame comprises the steps of:
estimating a particular spatial frequency image components, or spatial frequency image component in the full aperture optical system's passband by:
establishing a set of n spatial frequency measurements in the neighborhood of the k spatial frequency image components, or spatial frequency image component, to be estimated, where the phrase "in the neighborhood" refers to a temporal and spatial frequency region in the vicinity of the image frequency component, or image frequency components, to be estimated, and wherein the neighborhood includes an entire spatial frequency passband of the full aperture, all the time domain measurements, or any fraction thereof;
incorporating apriori and aposteriori knowledge concerning the strip aperture sensor system, the full aperture sensor system, the measurement process, and the noise and signal statistics into the Gauss-Markov estimation matrix;
applying the Gauss-Markov estimation matrix to the measured neighborhood of points to obtain the estimate of the selected spatial frequency image component, or spatial frequency image components, of the full aperture image;
repeating the process until all spatial frequency image components in the passband of the full aperture have been estimated; and
performing an inverse Fourier transform on the spatial frequency image components in the passband to obtain a synthesized image.

31. The method of claim 27 wherein the step of synthesizing the image frame comprises spatial domain image synthesizing the image frame comprising the steps of:
generating an estimation matrix for transforming idealized strip aperture spatial and temporal measurements associated with the strip aperture's point spread function to measurements obtained using a full aperture point spread function by:
establishing a set of n spatial measurements in the neighborhood of the spatial image component, or spatial image components, to be estimated, wherein the term "in the neighborhood" refers to a temporal, as well as, a spatial region in the vicinity of the point, or points, to be estimated, wherein the neighborhood can include the entire spatial region of the focal plane, and all the time domain measurements, or any fraction thereof;
incorporating apriori and aposteriori knowledge concerning the strip aperture sensor system, the full aperture sensor system, the measurement process, and the noise and signal statistics into the Gauss-Markov estimation matrix;
applying the Gauss-Markov estimation matrix to the measured neighborhood of points to obtain the estimate of the selected spatial image component, or spatial image components; and
repeating the process until all spatial components in the full aperture image have been determined, and whereby the Gauss-Markov estimation matrix must be calculated for each of the discrete spatial image components or spatial image components to be estimated in the full aperture passband.

* * * * *